E. A. KEELER.
COMPENSATION METHOD AND APPARATUS.
APPLICATION FILED MAY 5, 1920.

1,379,266.

Patented May 24, 1921.

INVENTOR.
Earl A. Keeler
BY Cornelius L. Ehret
His ATTORNEY.

UNITED STATES PATENT OFFICE.

EARL A. KEELER, OF NORRISTOWN, PENNSYLVANIA, ASSIGNOR TO LEEDS & NORTHRUP COMPANY, OF PHILADELPHIA, PENNSYLVANIA, A CORPORATION OF PENNSYLVANIA.

COMPENSATION METHOD AND APPARATUS.

1,379,266.      Specification of Letters Patent.      Patented May 24, 1921.

Application filed May 5, 1920. Serial No. 379,097.

*To all whom it may concern:*

Be it known that I, EARL A. KEELER, a citizen of the United States, residing in Norristown, county of Montgomery, State of Pennsylvania, have invented certain new and useful Improvements in Compensation Methods and Apparatus, of which the following is a specification.

My invention relates to a method of and apparatus for measuring the resistivity or conductivity of materials whose resistances change with temperature, such as metals, electrolytes, etc., with compensation for variations in temperature thereof.

My invention resides in a method of and apparatus for measuring or determining the concentration, resistance or conductivity of electrolytes or such materials notwithstanding variations in temperature, by producing an electrical effect by means subjected to the variations in temperature and effecting a compensation for temperature variations.

More specifically my invention resides in a method of and apparatus for measurements or determinations of the character referred to by measuring the resistance or conductivity of the material, as an electrolyte, as by a Wheatstone or conductivity bridge in one of whose conjugate conductors is connected a galvanometer whose indication becomes zero when the bridge is balanced, and impressing upon a suitable part of the Wheatstone or conductivity bridge, as upon the aforesaid galvanometer, a compensatory electromotive-force whose magnitude is dependent upon and corrective for the temperature of the material or electrolyte, said electro-motive-force being derived, preferably, from a conjugate circuit or conductor of a second Wheatstone bridge in one arm of which is connected a resistance having a temperature co-efficient and subjected to the temperature of the material or electrolyte.

My invention resides in methods and apparatus of the character hereinafter described and claimed.

For an illustration of one of various modes of practising my invention and of one of various forms my apparatus may take, reference is to be had to the accompanying drawing, in which:

Figure 1 is a diagrammatic view of the circuits and apparatus.

Fig. 2 is a fragmentary diagram illustrating a modified circuit arrangement.

Referring to the drawing, the first Wheatstone or conductivity bridge B comprises, in each of the four bridge arms, the resistances R, $R^1$, $R^2$ and the electrolyte cell C, the latter being of any suitable character or form for correlating with suitable electrodes the electrolyte whose resistance, conductivity or concentration is to be measured. Or in lieu of the electrolyte cell may be connected another type of resistance varying with temperature.

In the example illustrated, the cell C comprises the electrodes $a$ and $b$, both of platinum or any other suitable material, in contact with but separated from each other in the electrolyte E whose conductivity or concentration is to be determined. While the electrolyte E is shown in a container, as $c$, it will be understood that the electrodes $a$ and $b$ may be inserted in electrolyte which is flowing.

One of the conjugate conductors of the bridge B is indicated at $d$ and has connected in circuit therewith a source of current, preferably alternating current; in the example illustrated this source is the secondary S of the transformer T whose primary winding P is traversed by current from the generator A of alternating current. The generator A may deliver current of any suitable frequency at any suitable voltage; for example, it may be a 110 volt sixty-cycle generator. Since the voltages required in connection with the bridge B are ordinarily low, the transformer T may be a step-down transformer, the secondary S delivering current at six volts, for example. The other conjugate conductor is indicated at $e$, and in series therewith is connected any suitable indicating instrument, as, for example, the movable coil of an alternating current galvanometer G whose field coil $f$ is traversed by alternating current from the generator A, any suitable resistance, preferably noninductive, as an incandescent electric lamp L, being connected in series with the winding $f$ when suitable or desirable.

The conductor $e$ terminates in the slider contact $g$ slidable along the resistances R, $R^1$, the resistance R always being that portion to the left of the contact $g$ and resistance $R^1$ always being that portion to the right thereof. Associated with the movable contact $g$ is a scale $h$ calibrated in any suitable units, as those of resistance, conductivity or concentration of the electrolyte E, whereby the desired quantity may be read directly from the scale $h$, or may be determined from the reading thereof immediately beneath the movable contact $g$.

As thus far described, the apparatus may be operated as follows:

For an electrolyte of given character, but varying in concentration, the scale $h$ is predetermined, for a given constant temperature of the electrolyte. With the electrolyte at that temperature, and with the electrodes $a$ and $b$ of predetermined area of contact with the electrolyte and separated therein a predetermined distance, the slider contact $g$ is moved along the co-acting resistance until the deflection of the galvanometer G is nil in which case the bridge B is in balance and the concentration, conductivity or resistance of the electrolyte E is read off on the scale $h$ directly beneath the contact $g$ for the bridge-balancing position.

If, however, the temperature of the electrolyte E or other material varies from that for or at which the scale $h$ is correct, upon balancing the bridge as described an incorrect reading of the scale $h$ will be obtained, since the electrolyte or other material, having varied in temperature from the predetermined temperature for which the scale $h$ is correct, has changed in conductivity.

To compensate for variations in temperature of the electrolyte E from the aforesaid predetermined temperature for which the scale $h$ is correct, I impress upon the bridge B, preferably upon the galvanometer G, a compensating electro-motive-force which varies with variations in temperature of the electrolyte or other material in such way that the scale $h$ will be practically correct over a desired range of temperature variation. The compensating electro-motive-force opposes and is substantially equal to the difference of potential that would exist between the opposite ends of the conductor $e$ if the bridge B were first balanced with the electrolyte or resistance E at the temperature at which the scale $h$ has been calibrated and then thrown out of balance by rise of temperature of the electrolyte or resistance E. Upon application of the compensating electro-motive-force, no current flows through the galvanometer G and the bridge B remains in balance, though the temperature of the electrolyte or resistance E is no longer that for which the scale $h$ has been calibrated.

This compensating electro-motive-force may be produced in any suitable manner. For ease of adjustment and accuracy it is preferred, however, that it be provided by a conjugate conductor of a Wheatstone bridge, or equivalent.

In the preferred example illustrated, there is employed a second Wheatstone bridge B', in whose four arms are connected the resistances $R^3$, $R^4$, $R^5$ and $R^6$, the latter preferably of nickel or any other solid or liquid material having preferably substantial or high positive temperature coefficient. For example, the resistance $R^6$ may be of iron, aluminum, copper, electrolyte, etc. The resistances $R^3$, $R^4$ and $R^5$ have very small or substantially zero temperature coefficients; and similarly, the resistances R, $R^1$ and $R^2$ of the bridge B preferably have small or substantially zero temperature coefficients.

In circuit with one of the conjugate conductors $i$ of the bridge $B^1$ are connected the variable resistance or rheostat $R^7$ and the secondary $S^1$ of the transformer $T^1$, whose primary $P^1$ is connected to the aforesaid generator A. In this case again the voltage of the secondary $S^1$ is preferably low, and in any event, is of suitable magnitude for the purposes intended.

The second conjugate conductor $j$ has its one terminal connected to a point between the resistances $R^5$ and $R^6$, and its other terminal connected at $k$ to suitable point along the resistances $R^3$, $R^4$. The contact $k$ may be fixed and determined for all time, or may be slidable, for suitable correction or adjustment purposes, as indicated, if desired. In circuit with the conjugate conductor $j$ is connected the movable coil of the galvanometer G, whereby the galvanometer G is common to the conjugate conductor $e$ of bridge B and the conjugate conductor $j$ of the bridge $B^1$.

The resistance $R^6$ is in any suitable way subjected to the temperature of the electrolyte E, or to a temperature having a predetermined or known fixed relation to the temperature of the electrolyte E. By way of example, and preferably, the resistance $R^6$ is immersed directly in a stationary batch or stream of the electrolyte E, any suitable means, not shown, preferably being provided suitably to electrically insulate the resistance $R^6$ from the electrolyte E.

With the contact $k$ in fixed connection with resistances $R^3$, $R^4$, or having been adjusted to predetermined or suitable position, change of temperature of the resistance $R^6$ from the predetermined or standard temperature for which the scale $h$ is correct without recourse to the compensating electro-motive-force, unbalances the bridge $B^1$, if it had been in balance for said standard temperature, or changes the degree of unbalance of the bridge $B^1$, and there is a change of difference of potential between the terminals of the conjugate conductor $j$, and this potential difference is impressed upon the galvanometer G in opposition to the potential difference between the terminals of the conjugate conductor $e$ of the bridge B. By suitably choosing the magnitudes of the resistances of the bridge $B^1$, and particularly by suitably choosing the magnitude of the resistance $R^6$ and its material, the compensating electro-motive-force will suitably vary in magnitude with variations in temperature of the electrolyte E such that when impressed upon the galvanometer G compensation more or less perfect for variations in temperature of the electrolyte E will be effected, and the scale $h$, correct for the normal or standard temperature, will be correct also throughout the range through which the temperature of the electrolyte E may vary.

The resistance $R^7$ is preferably employed and serves, by adjustment of the amount thereof in circuit, to vary the degree or magnitude of the compensation effected; that is, adjustment of the resistance $R^7$ effects variation in the magnitude, other things being equal, of the compensating electro-motive-force impressed upon the galvanometer G. And such magnitude of the compensating electro-motive-force may be predetermined or set by suitably adjusting the resistance $R^7$ and then leaving it at such adjusted magnitude.

Variations in the voltage of the generator A will introduce no error, since the electro-motive-forces of the secondaries S and $S^1$ will similarly vary.

As shown in Fig. 2, the compensating electro-motive-force may be applied to the bridge B by connecting the conjugate conductor $j$ of bridge $B^1$ in series with the conjugate conductor $e$ of the bridge B.

The inductive coupling of each of the bridges B and $B^1$, by transformers T and $T^1$, with the source A, maintains the two bridges suitably independent of each other, inasmuch as their conjugate conductors $d$ and $i$ are not conductively connected to the same source.

While by preference I employ bridge arrangements, it will be understood that my invention comprehends also the employment of equivalent circuit arrangements, as for example, a potentiometer in lieu of either or both of the bridges B and $B^1$.

For brevity in the appended claims, measurement of conductivity is referred to, and should be understood as including measurements of conductance, resistance and resistivity.

What I claim is:

1. The method of measuring the conductivity of a material, which consists in producing an indication dependent upon the resistance of said material, and independently producing an effect affecting said indication to compensate for variation in temperature of said material from a predetermined temperature.

2. The method of measuring the conductivity of a material while at a temperature differing from a predetermined temperature, which consists in subjecting an indicating instrument to an electro-motive-force dependent upon the conductivity of said material, independently producing an electro-motive-force whose magnitude is dependent upon the departure of said material from said predetermined temperature, and impressing said second named electro-motive-force upon said instrument simultaneously with said first named electro-motive-force.

3. The method of measuring the conductivity of an electrolyte, which consists in passing alternating current therethrough, producing an indication dependent upon the magnitude of said current, separately producing an electro-motive-force whose magnitude depends upon the departure of said electrolyte from a predetermined temperature, and affecting said indication by said electro-motive-force.

4. The method of measuring the conductivity of a material, which consists in passing current through a resistance and said material and through resistances in a path in parallel to said material and said resistance, producing independently of said material and said resistances an electro-motive-force dependent upon the temperature of said material, simultaneously subjecting indicating means to said separately produced electro-motive-force and to the difference of potential across said resistance and one of said resistances, and varying the resistance until the indication is $nil$.

5. The method of measuring the conductivity of a material, which consists in connecting the material in an arm of a conductivity bridge, impressing an electro-motive-force on a conjugate conductor of said bridge, producing independently of said bridge an electro-motive-force whose magnitude depends upon the magnitude of departure of said material from a predetermined temperature, subjecting a galvanometer in the other conjugate conductor of said bridge to said second named electro-motive-force, and adjusting the resistance in said bridge until the deflection of said galvanometer is $nil$.

6. The method of measuring the conductivity or concentration of an electrolyte, which consists in connecting said electrolyte in an arm of a conductivity bridge, impressing an electro-motive-force on a conjugate conductor of said bridge, subjecting a resistance having a temperature coefficient and connected in an arm of a second bridge to variations of temperature of said electrolyte, impressing the potential difference of a conjugate conductor of said second bridge upon a galvanometer in the second conjugate conductor of said first bridge, and varying resistance in said first bridge until the deflection of said galvanometer is *nil*.

7. Apparatus for measuring the conductivity or concentration of an electrolyte comprising means for indicating the concentration or conductivity of said electrolyte at a predetermined temperature, and means independent of said indicating means responsive to variations in temperature of said electrolyte impressing upon said indicating means a compensating effect.

8. Apparatus for measuring the conductivity of a material comprising means for indicating the conductivity of said material at a predetermined temperature, said means including a calibrated scale, and means independent of said indicating means responsive to changes of temperature of the material impressing upon said indicating means a compensating effect, whereby said scale calibrated for said predetermined temperature is correct for the other temperatures partaken of by said material.

9. Apparatus for measuring the conductivity or concentration of an electrolyte comprising a conductivity bridge, said electrolyte connected in an arm of said bridge, a source of alternating current in a conjugate conductor of said bridge, an alternating current galvanometer in another conjugate conductor of said bridge, a resistance independent of said bridge subjected to the temperature of said electrolyte, a source of alternating current co-acting with said resistance to produce a potential difference varying with the temperature variation of said electrolyte, and means for impressing said potential difference upon said galvanometer to compensate said conductivity bridge for variations in temperature of said electrolyte.

10. Apparatus for measuring the conductivity or concentration of an electrolyte comprising a conductivity bridge, said electrolyte connected in an arm of said bridge, a source of alternating current in a conjugate conductor of said bridge, an alternating current galvanometer in another conjugate conductor of said bridge, a scale associated with said bridge calibrated for a predetermined temperature of the electrolyte, a resistance independent of said bridge subjected to the temperature of said electrolyte, a source of alternating current co-acting with said resistance to produce a potential difference varying with the temperature variations of said electrolyte, and means for impressing said potential difference upon said galvanometer, whereby said scale is correct for variations of said electrolyte from said predetermined temperature.

11. Apparatus for measuring the conductivity or concentration of an electrolyte comprising a conductivity bridge, said electrolyte connected in an arm of said bridge, a source of current connected in a conjugate conductor of said bridge, a second conjugate conductor including an alternating current galvanometer and terminating in a movable contact varying the relation of resistances in adjacent arms of said bridge, a scale associated with said movable contact and calibrated for a predetermined temperature of the electrolyte, a second bridge, a resistance in an arm of said second bridge having a temperature coefficient and subjected to the temperature variations of said electrolyte, a source of alternating current in a conjugate conductor of said second bridge, and another conjugate conductor of said second bridge including said galvanometer.

12. Apparatus for measuring the conductivity or concentration of an electrolyte comprising a conductivity bridge, said electrolyte connected in an arm of said bridge, a conjugate conductor of said bridge including a source of alternating current, an alternating current galvanometer connected in another conjugate conductor of said bridge, and a second bridge, a resistance having a temperature coefficient connected in an arm of said bridge and subjected to the variations of temperature of said electrolyte, a source of alternating current in a conjugate conductor of said second bridge, and another conjugate conductor of said second bridge impressing on said galvanometer an opposing electro-motive force whose magnitude is dependent upon the temperature of said electrolyte.

13. Apparatus for measuring the conductivity or concentration of an electrolyte comprising a conductivity bridge, said electrolyte connected in an arm of said bridge, a conjugate conductor of said bridge including a source of alternating current, an alternating current galvanometer connected in another conjugate conductor of said bridge, and a second bridge, a resistance having a temperature coefficient connected in an arm of said bridge and subjected to the variations of temperature of said electrolyte, a source of alternating current in a conjugate conductor of said second bridge, another conjugate conductor of said second bridge impressing on said galvanometer an opposing electro-motive-force whose magnitude is dependent upon the temperature of said electrolyte, and means for varying the magnitude of said compensating electro-motive-force.

14. Apparatus for measuring the conductivity or concentration of an electrolyte comprising a conductivity bridge, said electrolyte connected in an arm of said bridge, a conjugate conductor of said bridge including a source of alternating current, an alternating current galvanometer connected in another conjugate conductor of said bridge, and a second bridge, a resistance having a temperature coefficient connected in an arm of said bridge and subjected to the variations of temperature of said electrolyte, a source of alternating current in a conjugate conductor of said second bridge, another conjugate conductor of said second bridge impressing on said galvanometer an opposing electro-motive-force whose magnitude is dependent upon the temperature of said electrolyte, and an adjustable resistance in the first named conjugate conductor of said second bridge for varying the magnitude of the compensating electro-motive-force.

15. Apparatus for measuring the conductivity or concentration of an electrolyte comprising a pair of bridges, means for impressing upon said bridges alternating currents in phase with each other, the electrolyte connected in an arm of one of said bridges, a resistance having temperature coefficient subjected to the temperature variations of said electrolyte connected in an arm of the other of said bridges, and an alternating current galvanometer common to conjugate conductors of said bridges.

16. The combination with measuring apparatus including a galvanometer, of means for compensating the temperature variations comprising a Wheatstone bridge independent of said measuring apparatus, a resistance having a temperature coefficient connected in an arm of said bridge and subjected to the temperature variations, and a conjugate conductor of said bridge connected to said galvanometer.

17. Measuring apparatus comprising a bridge, a galvanometer coöperating therewith for indicating balance of said bridge, and means for compensating for temperature variations comprising a second bridge, a resistance having a temperature coefficient connected in an arm of said second bridge and subjected to the temperature variations, and a conjugate conductor of said second bridge connected to said galvanometer.

18. Apparatus for measuring the conductivity of a material comprising a bridge, said material connected in an arm of said bridge, a galvanometer associated with said bridge, means independent of said bridge for producing an electro-motive-force whose magnitude depends upon the temperature of said material, and connections from said means to said galvanometer for compensating for temperature variation of said material.

19. Apparatus for measuring the conductivity of a material comprising a bridge, said material connected in an arm of said bridge, a galvanometer associated with said bridge, a resistance independent of said bridge having a temperature coefficient subjected to a temperature varying with the temperature of said material, a source of current co-acting with said resistance to produce a potential difference varying with the temperature variation of said material, and means for impressing said potential difference upon said galvanometer.

20. Apparatus for measuring the conductivity of a material comprising a bridge, said material connected in an arm of said bridge, a galvanometer connected in a conjugate conductor of said bridge terminating in a movable contact varying the relation of resistances in adjacent arms of said bridge, a scale associated with said movable contact and calibrated for a predetermined temperature, a second bridge, a resistance in an arm of said second bridge having a temperature coefficient and subjected to temperature variations corresponding with variations in temperature of said material, and a conjugate conductor of said second bridge included in circuit with said galvanometer.

21. The combination with a Wheatstone bridge, of a source of alternating current, a transformer coupling said source to a conjugate conductor of said bridge, an alternating current galvanometer connected with said bridge, and a field coil for said galvanometer connected to said source of current independently of said transformer.

22. The combination with a plurality of balancing circuits, of a source of alternating current, a transformer coupling each of said circuits with said source, and a compensating connection from one of said balancing circuits to another of said balancing circuits.

23. The combination with a plurality of balancing circuits, of a source of alternating current, a transformer coupling each of said circuits with said source, a galvanometer associated with one of said balancing circuits, and a compensating connection from another of said balancing circuits for modifying the deflection of said galvanometer.

24. The combination with a plurality of Wheatstone bridges, of a source of alternating current, a transformer inductively coupling a conjugate conductor of each of said bridges with said source of current, and a connection from one of said bridges to the other.

25. The combination with a plurality of Wheatstone bridges, of a source of alternating current, a transformer inductively coupling a conjugate conductor of each of said bridges with said source of current, and connections between the other conjugate conductors of said bridges.

26. The combination with a plurality of Wheatstone bridges, of a source of alternating current, a transformer inductively coupling a conjugate conductor of each of said bridges with said source of current, a galvanometer in another conjugate conductor of one of said bridges, and a connection from the other conjugate conductor of the other of said bridges to said galvanometer.

In testimony whereof I have hereunto affixed my signature this 3 day of May, 1920.

EARL A. KEELER.